UNITED STATES PATENT OFFICE.

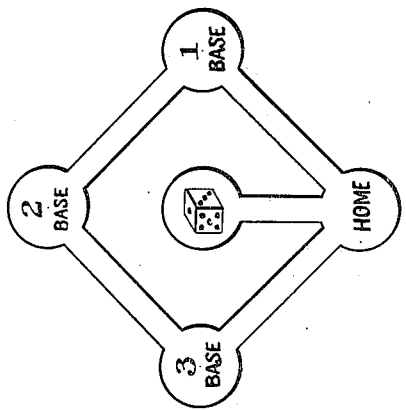

OSCAR R. TOMPKINS, OF ASBURY PARK, NEW JERSEY.

GAME.

1,069,741.

Specification of Letters Patent.

Patented Aug. 12, 1913.

Application filed January 10, 1912. Serial No. 670,518.

*To all whom it may concern:*

Be it known that I, OSCAR ROY TOMPKINS, a citizen of the United States, residing at Asbury Park, county of Monmouth, and State of New Jersey, have invented a new, original, and entertaining Game called Base-Ball with Dice, of which the following is a specification, reference being had to the accompanying drawings, forming part thereof.

My invention relates to an improvement in game apparatus and is for the purpose of furnishing amusement and entertainment by playing a game of base ball with a board, on which is a diagram of a base ball field and a box with a die.

In the drawings:—Figure 1 represents a base ball diamond with the pitcher's box and the four bases; Fig. 2 represents a number of charts which describe the kind of a ball pitched, kind of hit made by the batter, and the number of base hits made by the batter and the kind of ball pitched after two strikes and three balls have been called on the batter; Fig. 3 represents a number of charts which show whether the batter has hit a fly ball, a grounder, a foul ball, and whether he has been put out or is safe on base, also shows stolen base and forced plays.

The game is played according to the rules of a regular game of base ball. It may be played by two persons or any even number of persons, one-half the number of persons representing one side and one-half the number of persons representing the other side. The board representing the base ball field is placed between the two sides, one side representing the team in the field and the other side representing the team at the bat. The team in the field takes the box with a die and the game commences. The die is thrown and the number coming up on the die determines the kind of ball played, as revealed in the first column of Fig. 2 on the chart. Should this number determine that the ball was a hit, the die is again thrown to determine what kind of a hit. The number that then comes up determines the kind of a hit according to the second column of Fig. 2. Should this hit turn out a foul, the die is again thrown and the number coming up shows us in the seventh column Fig. 3 on the chart, whether the batter is out or safe. Should the die show that the hit was a grounder, then the die is again thrown and the number coming up shows in column six, Fig. 3, whether the batter is out or safe. Should the die show a hit was neither a foul nor a grounder, but a base hit, then the die is again thrown and the number coming up shows, according to the third column in Fig. 2, what kind of a base hit was made. Should the die show that a sacrifice, in-field fly, or a fly is hit, then the die is thrown again and the number that comes up shows according to column five, in Fig. 3, whether the batter is out or safe.

The above sets forth a general outline of the manner of playing the game and is believed to be sufficient so that the purpose of the invention can be clearly understood.

It is apparent that any suitable chance device may be used in lieu of the die herein referred to.

I claim—

1. A game apparatus consisting of a base ball diamond and a plurality of charts, each chart designating certain stages of play by words or characters, and each word or character having a number adjacent thereto, and a die adapted to be thrown and the number appearing on the die corresponding with a number on a chart designating the play to be made.

2. A game apparatus consisting of a representation of a base ball diamond, a plurality of charts having plays indicated thereon, the plays indicated on one chart being details of a play generically named on another chart, each play being provided with a designating character, and a chance device having a corresponding set of characters.

3. A game apparatus consisting of a representation of a base ball diamond, a chart having plays indicated thereon, the indications including one representative of a ball hit, a plurality of charts respectively having appropriate indications coöperatively determining the kind of ball hit and the result thereof, each indication on each chart having a designating character, and a chance device having a corresponding set of designating characters.

4. A game apparatus consisting of a representation of a base ball diamond, a chart having plays indicated thereon, the indications including appropriate ones representative of strike, ball and hit; a second chart having indications representative of the kind of hit; a third chart having indications representative of the number of base hit generically named on the second chart; other charts having indications respectively representative of details of kinds of hits, other than base hits, named on said first chart; one or more other charts having indications representative of further details of plays; each of said indications having a designating character; and a chance device having a corresponding set of characters.

OSCAR R. TOMPKINS.

Witnesses:
 JOSEPH M. TURNER,
 EDITH A. DAVIS.